(12) United States Patent
Chen et al.

(10) Patent No.: US 11,750,094 B2
(45) Date of Patent: Sep. 5, 2023

(54) CONTROL CIRCUIT FOR A SWITCHING CONVERTER

(71) Applicant: Silergy Semiconductor Technology (Hangzhou) LTD, Hangzhou (CN)

(72) Inventors: Huiqiang Chen, Hangzhou (CN); Jianxin Wang, Hangzhou (CN)

(73) Assignee: Silergy Semiconductor Technology (Hangzhou) LTD, Hangzhou (CN)

(*) Notice: Subject to any disclaimer, the term of this patent is extended or adjusted under 35 U.S.C. 154(b) by 71 days.

(21) Appl. No.: 17/368,982

(22) Filed: Jul. 7, 2021

(65) Prior Publication Data

US 2022/0038002 A1 Feb. 3, 2022

(30) Foreign Application Priority Data

Jul. 31, 2020 (CN) .......................... 202010756996.4

(51) Int. Cl.
*H02M 3/156* (2006.01)
*H02M 1/00* (2006.01)

(52) U.S. Cl.
CPC ....... *H02M 3/1566* (2021.05); *H02M 1/0025* (2021.05)

(58) Field of Classification Search
CPC .... H02M 3/156; H02M 3/1566; H02M 3/158; H02M 1/0025
See application file for complete search history.

(56) References Cited

U.S. PATENT DOCUMENTS

| | | | |
|---|---|---|---|
| 5,481,178 A * | 1/1996 | Wilcox | H02M 3/156 323/224 |
| 7,038,436 B2 | 5/2006 | Goto et al. | |
| 9,887,614 B1 * | 2/2018 | Horsky | H02M 3/156 |
| 10,622,896 B1 * | 4/2020 | Eggermont | H02M 3/158 |

* cited by examiner

*Primary Examiner* — Alex Torres-Rivera

(57) ABSTRACT

A control circuit for a switching converter, where: the control circuit is configured to generate a switching control signal according to an output voltage of the switching converter to control a switching state of a power transistor in the switching converter, and to adjust an output current of the switching converter; and a change trend of a length of a switching period of the power transistor is opposite to a change trend of the output voltage.

15 Claims, 5 Drawing Sheets

CONTROL CIRCUIT FOR A SWITCHING CONVERTER

RELATED APPLICATIONS

This application claims the benefit of Chinese Patent Application No. 202010756996.4, filed on Jul. 31, 2020, which is incorporated herein by reference in its entirety.

FIELD OF THE INVENTION

The present invention generally relates to the field of power electronics, and more particularly to switching converters and control circuits.

BACKGROUND

A switched-mode power supply (SMPS), or a "switching" power supply, can include a power stage circuit and a control circuit. When there is an input voltage, the control circuit can consider internal parameters and external load changes, and may regulate the on/off times of the switch system in the power stage circuit. Switching power supplies have a wide variety of applications in modern electronics. For example, switching power supplies can be used to drive light-emitting diode (LED) loads.

DETAILED DESCRIPTION

Reference may now be made in detail to particular embodiments of the invention, examples of which are illustrated in the accompanying drawings. While the invention may be described in conjunction with the preferred embodiments, it may be understood that they are not intended to limit the invention to these embodiments. On the contrary, the invention is intended to cover alternatives, modifications and equivalents that may be included within the spirit and scope of the invention as defined by the appended claims. Furthermore, in the following detailed description of the present invention, numerous specific details are set forth in order to provide a thorough understanding of the present invention. However, it may be readily apparent to one skilled in the art that the present invention may be practiced without these specific details. In other instances, well-known methods, procedures, processes, components, structures, and circuits have not been described in detail so as not to unnecessarily obscure aspects of the present invention.

A switching converter is a power conversion circuit that can convert an input voltage into another constant output signal or adjustable output signal through different architectures, and as such is widely used in electronic products such as mobile devices. Constant off-time (CFT) control technology is a pulse frequency modulation (PFM) control technology, which can adjust the output voltage by controlling the power transistor of the switching converter to turn off for a constant time in each switching period. As compared with traditional pulse-width modulation (PWM), PFM control technology has advantages of high efficiency under a light load and fast response speed. For example, when the output voltage of the switching converter changes, due to the switching of different loads, the peak value of the inductor current may remain unchanged at the switching moment because of the constant turn-off time and lag of the internal circuit response. Also, the falling value of the inductor current can change in the same turn-off time, which may lead to the changes of the output current, possibly resulting in a poor load current regulation rate of the output current.

Figure 1:
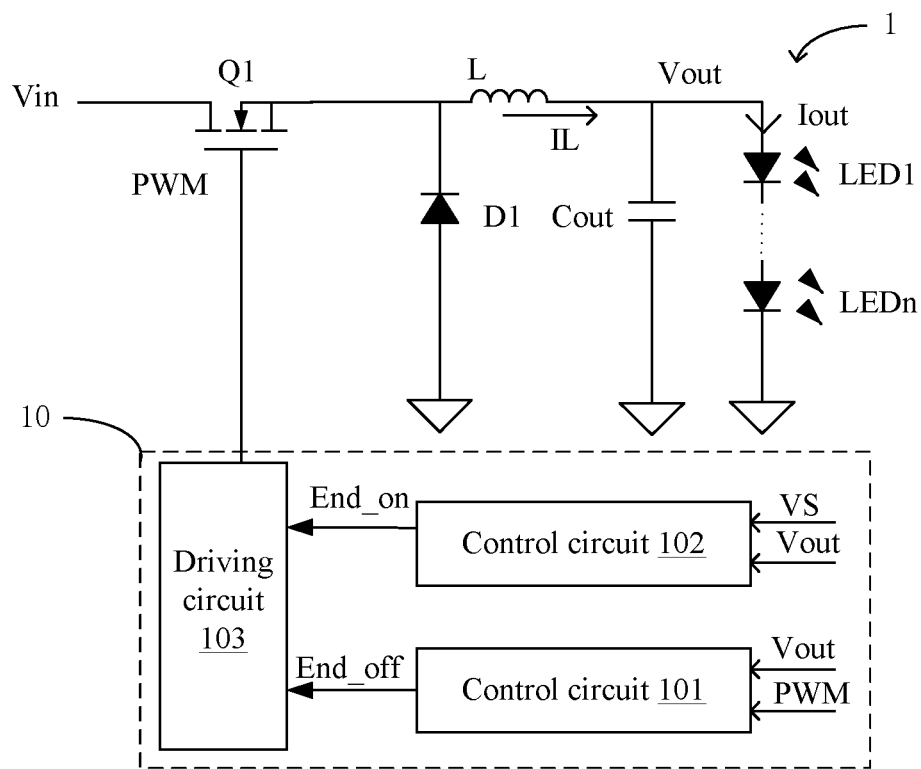
FIG. 1 is a schematic block diagram of an example switching converter, in accordance with embodiments of the present invention.

Referring now to FIG. 1, shown is a schematic block diagram of an example switching converter, in accordance with embodiments of the present invention. In this particular example, switching converter 1 can include a power stage circuit (e.g., a buck topology). The power stage circuit can include power transistor Q1 with a first terminal for receiving input voltage Vin, inductor L with a first terminal that can connect to a second terminal of power transistor Q1 and a second terminal that can connect to an output terminal of the switching converter, and diode D1 with a cathode that can connect to the second terminal of power transistor Q1 and an anode that can connect to a reference ground of the switching converter. Further, output capacitor Cout can connect between the output terminal of the power converter and the reference ground to generate output voltage Vout, and can connect in parallel with a load to provide energy storage. In this example, the load can be a plurality of light-emitting diodes (LED) connected in series.

In dimming applications, the brightness can be changed by changing the number of LEDs, so output voltage Vout of the switching converter can change in practical applications. Therefore, control circuit 10 may adopt a closed-loop control to generate switching control signal PWM according to output voltage Vout, in order to control the switching state of power transistor Q1 and adjust output current Iout of the switching converter, thereby providing energy for the load. In this example, the change trend of the switching period of power transistor Q1 can be opposite to that of output voltage Vout. Also, control circuit 10 can dynamically adjust the length of the switching period in response to the change of the output voltage to keep the average value of the output current constant, thereby actively improving the loop response speed and the output current stability when the output voltage changes.

In one example, control circuit 10 can include control circuit 101. Control circuit 101 can adjust the switching period of the switching converter according to output voltage Vout and the duty cycle of the switching converter, in order to maintain the average value of the output current as constant when output voltage Vout of the switching converter changes. In this example, control circuit 101 may receive switching control signal PWM to obtain the duty cycle of the switching converter. In one implementation, the switching period can include a first time interval and a second time interval. Control circuit 101 may generate a timing signal according to output voltage Vout, and adjust the length of the second time interval by comparing the timing signal against a timing reference signal, thereby changing the length of the switching period.

Here, the timing reference signal can be generated according to the duty ratio of the switching converter, and the timing signal can be a ramp signal having a rising slope with the same change trend as that of output voltage Vout. When the timing signal reaches the timing reference signal, control circuit 101 may generate control signal End_off to control the power transistor Q1 to be turned on, and then input voltage Vin can supply energy to the load. For example, when output voltage Vout increases, the rising speed of the timing signal can increase, and the timing signal can rise to the timing reference signal more quickly, thus shortening the length of the second time interval, and thereby shortening the length of the entire switching cycle, and vice versa. In this example, the second time interval can be the turn-off time of power transistor Q1.

Control circuit 10 can also include control circuit 102. In this example, control circuit 102 may generate control signal End_on according to output voltage Vout and current sampling signal VS representing inductor current IL, in order to control power transistor Q1 to be turned off, and then inductor L may release energy to the load. In this example, control circuit 10 can adopt different control modes to control the on-time of power transistor Q1, in order to adjust the length of the first time interval. For example, when control circuit 10 adopts the peak current control mode, control circuit 102 can sample the current flowing through inductor L to generate current sampling signal VS, and to generate control signal End_on when current sampling signal VS reaches peak current reference value Vc, to control power transistor Q1 to be turned off.

Here, peak current reference value Vc may be generated according to the error between an output feedback signal characterizing output voltage Vout and a voltage reference signal. When power transistor Q1 is turned off, diode D1 can conduct and the energy may be transferred from inductor L to the load of the switching converter. When the timing signal reaches the timing reference signal, power transistor Q1 can again be turned on, and a new switching period may begin. In another example, control circuit 10 can adopt a constant on-time control mode to control the turn-on time of power transistor Q1. For example, when the control circuit adopts the constant on-time control mode, control circuit 10 may generate a feedback error signal according to the error between the output feedback signal representing output voltage Vout and the voltage reference signal. Also, control signal End_on can be generated according to the feedback error signal and a ramp signal, in order to control power transistor Q1 to be turned on for a predetermined time in each switching period.

Control circuit 10 can also include driving circuit 103. Driving circuit 103 can generate switching control signal PWM according to control signals End_off and End_on, in order to control power transistor Q1 to be turned on or off. In one implementation, driving circuit 103 can include an RS flip-flop. A reset terminal of the RS flip-flop may receive control signal End_off, a set terminal of the RS flip-flop may receive control signal End_on, and switching control signal PWM can be generated at an output terminal of the RS flip-flop. It should be understood that in order to enhance the driving capability, a driver or other form of circuit can be added between the output terminal of the RS flip-flop and the control terminal of power transistor Q1 to better control the power stage circuit.

In one example, control circuit 101 can include a timing circuit and a timing reference signal generation circuit. The timing circuit may generate a timing current according to output voltage Vout, and the timing current may generate a timing signal by charging a timing capacitor. Here, the timing current may have a linear relationship with output voltage Vout and the same change trend with output voltage Vout; that is, the timing current can increase with an increase of output voltage Vout, and vice versa. The timing reference signal generation circuit may generate a timing reference signal according to switching control signal PWM. When output voltage Vout switches from a first voltage to a second voltage, the second time interval of the switching period can be dynamically adjusted in response to the change of the output voltage since the timing reference signal slowly changes. This can ensure that output current Tout does not change suddenly at the switching moment of output voltage Vout, and the average value of the output current can remain constant.

For example, the timing circuit can be implemented by a transconductance operational amplifier. A first input terminal of the transconductance operational amplifier can receive the output feedback signal representing output voltage Vout, a second input terminal of the transconductance operational amplifier can receive the voltage reference signal, and an output terminal of the transconductance operational amplifier can generate the timing current. The timing capacitor can be coupled to the output terminal of the transconductance operational amplifier. For example, when output voltage Vout increases, the timing current can increase, and thus the charging speed of the timing capacitor may increase, such that the timing signal can more quickly reach the timing reference signal. In this way, the second time interval can be shortened in the switching period and correspondingly the switching period can be shortened, and vice versa.

In particular embodiments, the second time interval in the switching period can be dynamically adjusted according to the change of the output voltage, in order to change the length of the switching period. As a result, the length of the switching period and the output voltage may have an opposite change trend, in order to ensure that the output current does not mutate when the output voltage suddenly changes. In addition, the average value of the output current can remain constant, thereby actively improving the dynamic response speed of the loop and the stability of the output current.

Figure 2:
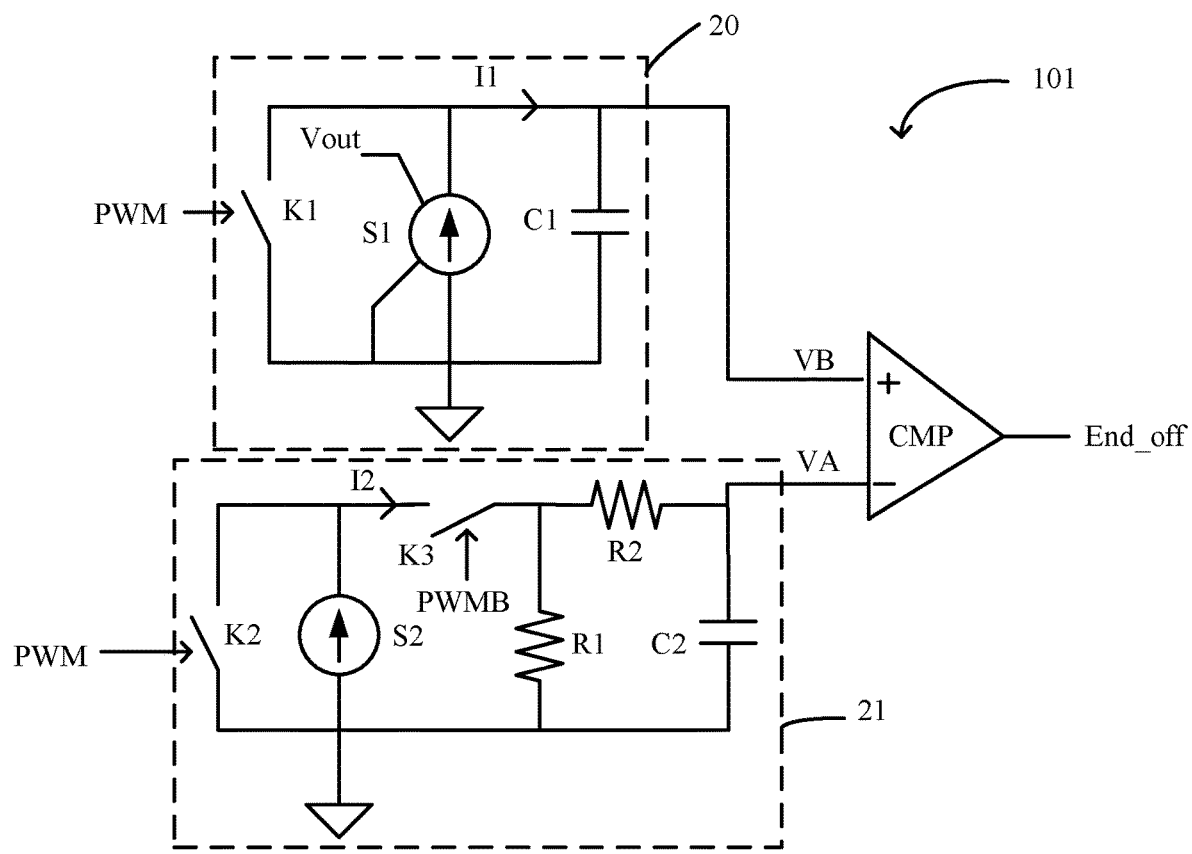
FIG. 2 is a schematic block diagram of an example first control circuit, in accordance with embodiments of the present invention.

Referring now to FIG. 2, shown is a schematic diagram of an example first control circuit, in accordance with embodiments of the present invention. In this example, control circuit 101 can include timing circuit 20 and timing reference signal generation circuit 21. Timing circuit 20 can include controlled current source S1 and timing capacitor C1 that can connect in parallel. In this example, controlled current source S1 can be controlled by output voltage Vout to generate timing current I1. For example, a first control terminal of controlled current source S1 may receive output voltage Vout, and a second control terminal of controlled current source S1 can connect to the reference ground. Here, timing current I1 can be expressed as I1=kVout, where k is the conversion coefficient of controlled current source S1. Timing current I1 can charge timing capacitor C1 to generate timing signal VB across timing capacitor C1. The timing circuit also can include timing switch K1 that can connect in parallel with controlled current source S1 and timing capacitor C1, in order to control timing current I1 to charge timing capacitor C1 during the second time interval of the switching period and reset timing signal VB to zero when the second time interval ends.

Timing reference signal generation circuit 21 can include current source S2, switches K2 and K3, and resistor R1. For example, current source S2 and switch K2 can connect in parallel, and resistor R1 can connect in parallel with current source S2 and switch K2 through switch K3. In this example, switch K2 can be controlled by switching control signal PWM, and switch K3 can be controlled by inverted signal PWMB of switching control signal PWM; that is, switches K2 and K3 may be turned on or off complementarily. In the first time interval of the switching period, switch K2 can be turned on, switch K3 may be turned off, and the voltage across resistor R1 can be zero. In the second time interval of the switching period, switch K3 can be turned on, switch K2 may be turned off, and current source S2 can generate current I2 flowing through resistor R1, which may generate the voltage across resistor R1.

Thus, the voltage across resistor R1 can approximately be a square wave. Further, timing reference signal generation circuit 21 can also include a filter circuit for filtering the voltage across resistor R1 to generate timing reference signal VA, such that timing reference signal VA may have a linear relationship with the duty cycle of the switching converter. For example, timing reference signal VA may be in a negative correlation with the duty cycle of the switching converter. In this example, the filter circuit can include resistor R2 and capacitor C2 that can connect in series forming the RC filter, and timing reference signal VA may be generated at the common terminal of resistor R2 and capacitor C2.

In this example, control circuit 101 can also include a comparison circuit. An inverting input terminal of the comparison circuit may receive timing reference signal VA, a non-inverting input terminal of the comparison circuit may receive timing signal VB, and an output terminal of the comparison circuit may generate control signal End_off by comparing timing reference signal VA against timing signal VB. Here, timing reference signal VA can be expressed as follows in Equation (1).

$$VA = I2 \times R1 \times (1-D) \quad (1)$$

Here, D is the duty cycle of the switching converter. Timing signal VB can be expressed as follows in Equation (2).

$$VB = \frac{I1 \times (1 - D) \times Ts}{C1} \quad (2)$$

Here, Ts is the switching period of the switching converter. When timing signal VB reaches timing reference signal VA, control signal End_off generated by control circuit 101 can be active, and the power transistor may again be turned on. Therefore, the switching period of the switching converter can be expressed as follows in Equation (3).

$$Ts = R1 \times C1 \times \frac{I2}{k \times Vout} \quad (3)$$

From Equation (3), it can be seen that the switching period is in an inverse proportion to output voltage Vout. As described above, the switching converter in certain embodiments can dynamically adjust the second time interval of the switching period in response to the change of the output voltage to change the length of the switching period. Accordingly, the length of the switching period may have an opposite change trend with the output voltage, thereby actively improving the dynamic response speed of the loop and the stability of the output current.

Figure 3:
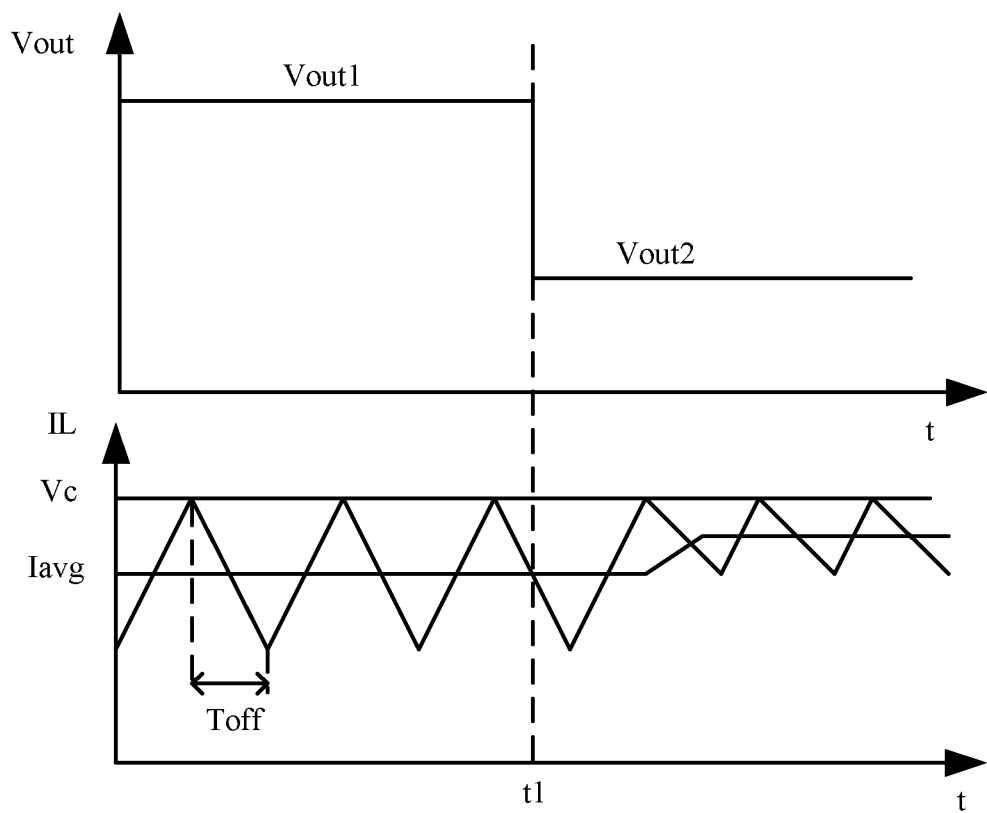
FIG. 3 is a waveform diagram of example operation of an example switching converter.

Referring now to FIG. 3, shown is a waveform diagram of example operation of an example switching converter. This example switching converter may not adjust the second time interval of the switching period under the constant off-time control; that is, turn-off time Toff of the power transistor may not be adjusted. At time t1, the output voltage of the switching converter may switch from voltage Vout1 to voltage Vout2; that is, the output voltage suddenly decreases. Also, turn-off time Toff of the switching converter may not mutate, and the response of the closed-loop control loop for the switching converter may lag behind. Thus, peak current reference value Vc may remain unchanged at the moment when the output voltage switches, which can lead to a change in inductor current IL of the switching converter. In addition, average value Iavg of the output current of the switching converter may not remain constant, which can result in poor load current regulation rate of the output current.

Figure 4:
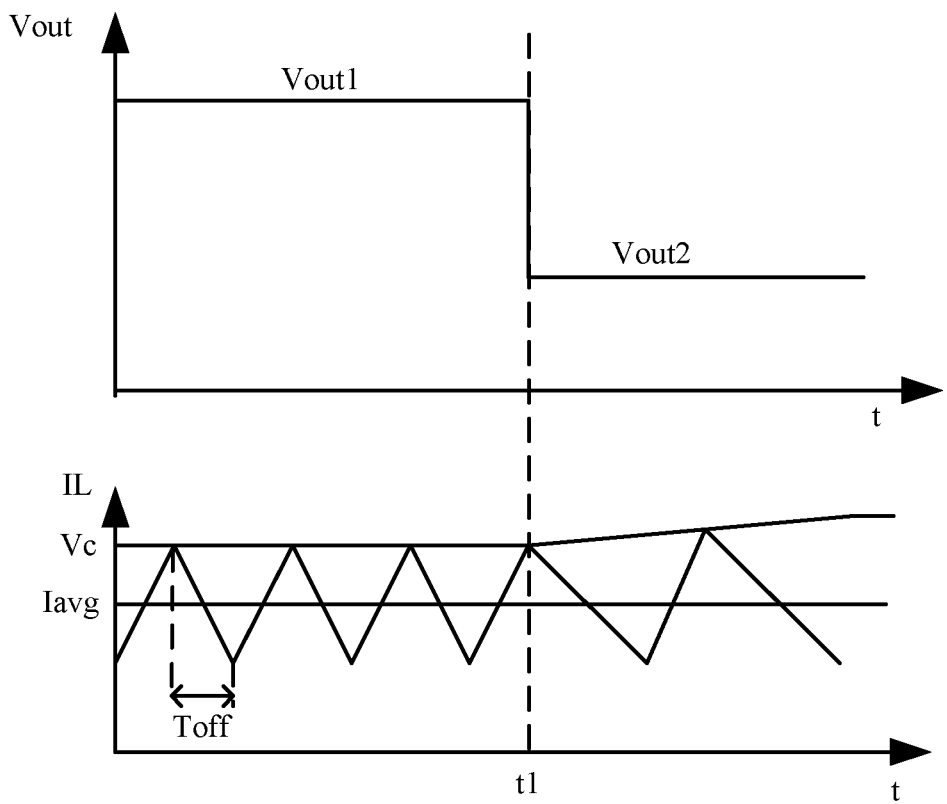
FIG. 4 is a waveform diagram of example operation of the switching converter, in accordance with embodiments of the present invention.

Referring now to FIG. 4, shown is a waveform diagram of example operation of the switching converter, in accordance with embodiments of the present invention. At time t1, the output voltage of the switching converter may switch from voltage Vout1 to voltage Vout2; that is, the output voltage suddenly decreases, and peak current reference value Vc may remain essentially unchanged at this moment (e.g., t1). The control circuit of the switching converter can dynamically adjust turn-off time Toff of the power transistor in response to the change of output voltage Vout, and turn-off time Toff of the power transistor can be controlled to increase with the decrease of output voltage, thereby increasing the length of the switching period of the switching converter. Thus, inductor current IL of the switching converter may not change suddenly at the moment when output voltage Vout switches, and thus average value Iavg of the output current can remain constant.

After time t1, under the closed-loop adjustment of the switching converter, peak current reference value Vc may slowly increase to adjust the peak value of inductor current IL, and the switching converter can enter a stable operating state. Therefore, the response speed of closed-loop control loop and the stability of output current may both be improved. It should be understood that this example only shows the operation waveform of the switching converter when output voltage Vout decreases, and the operation waveform of the switching converter when output voltage Vout increases is also within the protection scope of the present invention.

Figure 5:
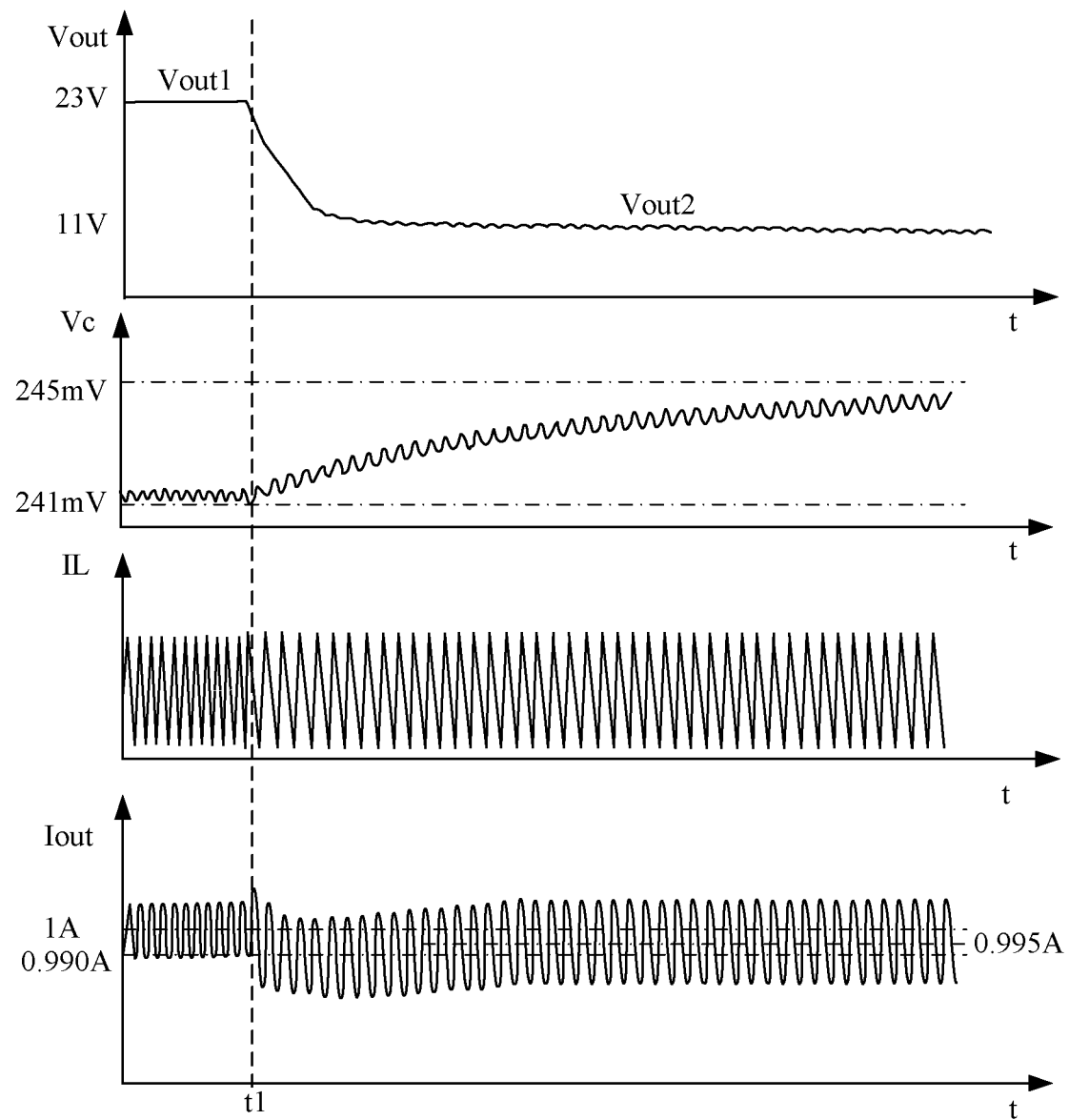
FIG. 5 is a simulation waveform diagram of example operation of the switching converter, in accordance with embodiments of the present invention.

Referring now to FIG. 5, shown is a simulation waveform diagram of example operation of the switching converter, in accordance with embodiments of the present invention. For example, input voltage Vin of the switching converter is constant. At time t1, output voltage Vout may change from 23V to 11V, and peak current reference value Vc may remain essentially unchanged (e.g., about 241 mV) at this moment. The control circuit of the switching converter may dynamically adjust turn-off time Toff of the power transistor in response to the change of output voltage Vout, and turn-off time Toff of the power transistor can increase with the decrease of output voltage Vout, thus increasing the length of the switching period of the switching converter.

After time t1, the peak value of inductor current IL can be increased and the average value of inductor current IL may be unchanged. Due to various hysteresis responses in the switching converter, output current Iout may have a small change amount at the switching moment (e.g., t1) of output voltage Vout, but the change amount is only, e.g., about 12 mV in this particular example, which may not affect the stability of output current Iout. In the example of FIG. 5, before output voltage Vout changes; that is, when output voltage Vout is, e.g., 23V, the stable average value of output current Iout is, e.g., about 1 A. After output voltage Vout changes; that is, when output voltage Vout changes to, e.g., about 11V, the stable average value of output current Iout is, e.g., 0.995 A. That is, the average value of output current Iout may only change by, e.g., about 5 mA, so the average value of the output current may remain essentially constant. It should be understood that the above values are given as an example only, and those skilled in the art will recognize that different circuit setting parameters, output voltage values, etc., can be selected in order to meet different application requirements.

In particular embodiments, the control circuit of the switching converter can dynamically adjust the second time interval of the switching period in response to a change of the output voltage of the switching converter. This can change the length of the switching period, such that the length of the switching period and the output voltage may have an opposite change trend. Thus, the output current may not mutate when the output voltage suddenly changes, and the average value of the output current can be maintained as constant, thereby actively improving the dynamic response speed of the control loop and the stability of the output current.

The embodiments were chosen and described in order to best explain the principles of the invention and its practical applications, to thereby enable others skilled in the art to best utilize the invention and various embodiments with modifications as are suited to particular use(s) contemplated. It is intended that the scope of the invention be defined by the claims appended hereto and their equivalents.

What is claimed is:

1. A control circuit for a switching converter, wherein:
   a) the control circuit is configured to generate a switching control signal according to an output voltage of the switching converter to control a switching state of a power transistor in the switching converter, and to adjust an output current of the switching converter;
   b) the control circuit is configured to adjust a length of a switching period of the power transistor opposite to a change trend of the output voltage, in order to maintain an average of the output current as constant;
   c) the switching period comprises a first time interval and a second time interval; and
   d) the control circuit is configured to generate a timing signal according to the output voltage and to adjust the second time interval by comparing the timing signal against a timing reference signal.

2. The control circuit of claim 1, wherein the control circuit is configured to adjust the length of the switching period when the output voltage switches from a first voltage to a second voltage.

3. The control circuit of claim 1, wherein the length of the switching period is inversely proportional to the output voltage.

4. The control circuit of claim 1, wherein the control circuit is configured to adjust the first time interval according to an inductor current of the switching converter and a peak current reference value.

5. The control circuit of claim 1, comprising a first control circuit configured to generate a first control signal according to the output voltage and a duty cycle of the switching converter to adjust the length of the switching period.

6. The control circuit of claim 5, wherein the first control circuit comprises a timing circuit configured to generate a timing current according to the output voltage, wherein the timing current charges a timing capacitor to generate a timing signal, and a rising slope of the timing signal has the same change trend as the output voltage.

7. The control circuit of claim 6, wherein the timing current is proportional to the output voltage.

8. The control circuit of claim 6, wherein the first control circuit further comprises a timing reference signal generation circuit configured to receive the switching control signal, and to generate a timing reference signal according to the duty cycle of the switching converter.

9. The control circuit of claim 8, wherein the first control circuit further comprises a comparator having a first input terminal for receiving the timing signal, a second input terminal for receiving the timing reference signal, and an output terminal for activating the first control signal when the timing signal reaches the timing reference signal.

10. The control circuit of claim 6, wherein the timing reference signal is in a negative correlation with the duty cycle of the switching converter.

11. The control circuit of claim 6, wherein the timing circuit comprises a timing switch coupled in parallel with the timing capacitor, and being configured to control the timing circuit to start timing at a beginning of the second time interval and control the timing signal to reset when the second time interval ends.

12. The control circuit of claim 5, further comprising a second control circuit configured to generate a second control signal according to an error between an output feedback signal representing the output voltage and a voltage reference signal, wherein the switching control signal is generated according to the first and second control signals.

13. The control circuit of claim 12, wherein the second control circuit is configured to generate a peak current reference value according to the error, and to generate the second control signal when a current sampling signal representing an inductor current of the switching converter reaches the peak current reference value.

14. A voltage regulator, comprising the control circuit of claim 1, and further comprising:
   a) an input terminal configured to receive an input voltage and an input current;
   b) a power stage circuit comprising a power transistor coupled to an inductor, wherein the inductor is coupled to the input terminal;
   c) an output terminal coupled to a load and the inductor; and
   d) wherein the control circuit is configured to control the power transistor to generate an output voltage at the output terminal.

15. The voltage regulator of claim 14, wherein the load comprises a plurality of light-emitting diodes (LEDs) coupled in series, and the output voltage is determined in accordance with a number of the plurality of LEDs controlled to be in a conduction state.

* * * * *